(12) United States Patent
Frecks, Jr. et al.

(10) Patent No.: US 9,071,924 B2
(45) Date of Patent: Jun. 30, 2015

(54) SYSTEMS AND METHODS FOR DIGITAL FORENSIC TRIAGE

(75) Inventors: Austin P. Frecks, Jr., Lorton, VA (US); Anthony W. Curry, Land O Lakes, FL (US); Donald G. Lynn, Jr., Lakeland, FL (US); Christopher J. Bland, Valrico, FL (US)

(73) Assignee: Aces & Eights Corporation, Shinnston, WV (US)

( * ) Notice: Subject to any disclaimer, the term of this patent is extended or adjusted under 35 U.S.C. 154(b) by 593 days.

(21) Appl. No.: 13/528,088

(22) Filed: Jun. 20, 2012

(65) Prior Publication Data

US 2012/0322422 A1 Dec. 20, 2012

Related U.S. Application Data

(60) Provisional application No. 61/498,646, filed on Jun. 20, 2011, provisional application No. 61/498,658, filed on Jun. 20, 2011, provisional application No. 61/498,662, filed on Jun. 20, 2011.

(51) Int. Cl.
*H04M 3/00* (2006.01)
*H04W 4/00* (2009.01)
*H04L 29/06* (2006.01)
(Continued)

(52) U.S. Cl.
CPC ............ *H04W 4/003* (2013.01); *H04L 63/302* (2013.01); *H04W 12/12* (2013.01); *G06F 21/577* (2013.01); *G06F 2221/2153* (2013.01)

(58) Field of Classification Search
USPC ........ 455/418, 419, 420, 554.2, 556.1, 556.2, 455/557, 558, 559; 707/706, 708, 767, 768, 707/769, 770, 771, 795, 796
See application file for complete search history.

(56) References Cited

U.S. PATENT DOCUMENTS

| | | | |
|---|---|---|---|
| 2005/0273330 A1* | 12/2005 | Johnson | 704/246 |
| 2007/0203866 A1 | 8/2007 | Kidd et al. | |
| 2008/0244034 A1* | 10/2008 | Shannon et al. | 709/217 |

(Continued)

FOREIGN PATENT DOCUMENTS

WO WO2007075813 5/2007

OTHER PUBLICATIONS

Notification of Transmittal; International Search Report; and Written Opinion of the International Searching Authority, Dec. 18, 2012; US PCT/US2012/043221 (claiming priority to the present application).

(Continued)

*Primary Examiner* — Dai A Phuong
(74) *Attorney, Agent, or Firm* — Dinsmore & Shohl LLP; Monika L. Jaensson, Esq.

(57) ABSTRACT

In one embodiment, a method for forensic triage may include coupling, communicatively, a computer and a mobile device. The computer can be booted with machine readable instructions stored on the one or more mobile memory modules of the mobile device. A search data set can be received with one or more mobile processors of the mobile device. One or more processors of the computer, the one or more mobile processors, or both, can execute, automatically, the machine readable instructions stored on the one or more mobile memory modules of the mobile device to search one or memory modules of the computer in a read only mode for triage data that corresponds to the search data set. The triage data can be transmitted via one or more communication modules of the mobile device.

10 Claims, 4 Drawing Sheets

(51) Int. Cl.
*G06F 21/57* (2013.01)
*H04W 12/12* (2009.01)

(56) References Cited

U.S. PATENT DOCUMENTS

2009/0013165 A1* 1/2009 Chow et al. .............. 713/2
2009/0063191 A1   3/2009 Vasquez et al.
2010/0250735 A1* 9/2010 Andersen ................ 709/224
2010/0281051 A1* 11/2010 Sheffi et al. .............. 707/770
2011/0153428 A1* 6/2011 Ramer et al. ............. 705/14.64
2011/0159868 A1* 6/2011 Granda et al. ............ 455/423
2011/0255690 A1* 10/2011 Kocher et al. ............ 380/210
2012/0114119 A1* 5/2012 Ahuja et al. .............. 380/44

OTHER PUBLICATIONS

International Preliminary Report on Patentability, dated Dec. 23, 2013; mailing date Jan. 9, 2014; US PCT/US2012/043221 (claiming priority to the present application).

* cited by examiner

SYSTEMS AND METHODS FOR DIGITAL FORENSIC TRIAGE

CROSS REFERENCE TO RELATED APPLICATIONS

This application claims the benefit of U.S. Provisional Application No. 61/498,646, filed Jun. 20, 2011, U.S. Provisional Application No. 61/498,658, filed Jun. 20, 2011, and U.S. Provisional Application No. 61/498,662, filed Jun. 20, 2011.

TECHNICAL FIELD

The present specification generally relates to systems and methods for analyzing computers and, more specifically, to systems and methods for performing digital forensic triages on computers.

BACKGROUND

Digital forensics generally relates to the collection of legal evidence found in computers and digital storage media. During digital forensics it is generally desired to examine the contents of computers and digital media in a forensically sound manner. Specifically, it is desirable to preserve the computer or digital media that is being examined in a state that is unaltered by the examination.

The process for performing digital forensics generally includes on-scene documentation, collection, and analysis. During on-scene documentation, the environment around the computer can be documented via sketches, interviews, digital photography and/or digital video recording. In the collection phase, digital data is acquired, while following procedures that preserve the integrity of the data. Once acquired, the data can be analyzed using a combination of automated and manual methods to assess and extract data of particular interest, while preserving the integrity of the data.

Digital forensics can be utilized to collect evidence relevant to a variety of investigations such as, for example, child abuse or exploitation, computer intrusion, counterfeiting, death investigations, domestic violence, threats, extortion, e-mail threats, harassment, stalking, gambling, identity theft, narcotics, online or economic fraud, prostitution, software piracy, telecommunication fraud, terrorism (Homeland Security). However, because of the increasingly complex nature of the examination, digital forensic analysis can require analysts with a relatively high degree of skill and specialized training.

Accordingly, a need exists for alternative systems and methods for performing digital forensic triages on computers.

SUMMARY

In one embodiment, a method for forensic triage may include coupling, communicatively, a computer and a mobile device. The computer may include one or more processors conductively coupled to one or more memory modules. The mobile device may include one or more mobile processors conductively coupled to one or more mobile memory modules and one or more communication modules. Machine readable instructions can be stored on the one or more mobile memory modules of the mobile device. The computer can be booted with the machine readable instructions stored on the one or more mobile memory modules of the mobile device. A search data set can be received with the one or more mobile processors of the mobile device. The one or more processors, the one or more mobile processors, or both, can execute automatically the machine readable instructions stored on the one or more mobile memory modules of the mobile device to search the one or memory modules of the computer in a read only mode for triage data that corresponds to the search data set. The triage data can be transmitted via the one or more communication modules of the mobile device.

In another embodiment, a system for forensic triage may include a mobile device, a cloud computing device, a search data set and machine readable instructions. The mobile device may include one or more mobile processors conductively coupled to one or more mobile memory modules and one or more communication modules. The cloud computing device can be communicatively coupled to the one or more communication modules of the mobile device. The cloud computing device may include one or more cloud processors conductively coupled to one or more cloud memory modules. The search data set can be stored on the one or more mobile memory modules of the mobile device, the one or more cloud memory modules, or both. The machine readable instructions can be stored on the one or more mobile memory modules of the mobile device, the one or more cloud memory modules, or both. When the one or more communication modules of the mobile device is communicatively coupled to a computer that includes one or more processors conductively coupled to one or more memory modules, the one or more processors, the one or more mobile processors, or both can be configured to execute the machine readable instructions. The computer can be booted according to the machine readable instructions. The one or memory modules of the computer can be searched in a read only mode for triage data that corresponds to the search data set. The one or more cloud processors, the one or more mobile processors, or both can execute the machine readable instructions. The triage data, the search data set, or both can be compared to a data archive that is protected by a firewall. The receipt of data indicative of a match between the triage data and the data archive, the search data set and the data archive, or both can be permitted. The receipt of predefined segments of the data archive can be denied.

In yet another embodiment, a method for forensic triage may include coupling, communicatively, a computer and a mobile device. The computer may include one or more processors conductively coupled to one or more memory modules. The mobile device may include one or more mobile processors conductively coupled to one or more mobile memory modules and one or more communication modules. Machine readable instructions can be stored on the one or more mobile memory modules of the mobile device. The computer can be booted with the machine readable instructions stored on the one or more mobile memory modules of the mobile device. A search data set can be received with the one or more mobile processors of the mobile device. The search data set may include a keyword list that includes a plurality of keywords of interest, a hash list that includes a plurality of hashes that correspond to output from a cryptographic hash function, and a search list that includes a plurality of identifiers that each correspond to an instance of a system resource. The one or more processors, the one or more mobile processors, or both, can execute, automatically, the machine readable instructions stored on the one or more mobile memory modules of the mobile device to search the one or memory modules of the computer in a read only mode for triage data that corresponds to the search data set. The mobile device and a cloud computing device can be communicatively coupled with a cellular network. The triage data can be transmitted via the one or more communication modules of the mobile device over the cellular network.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
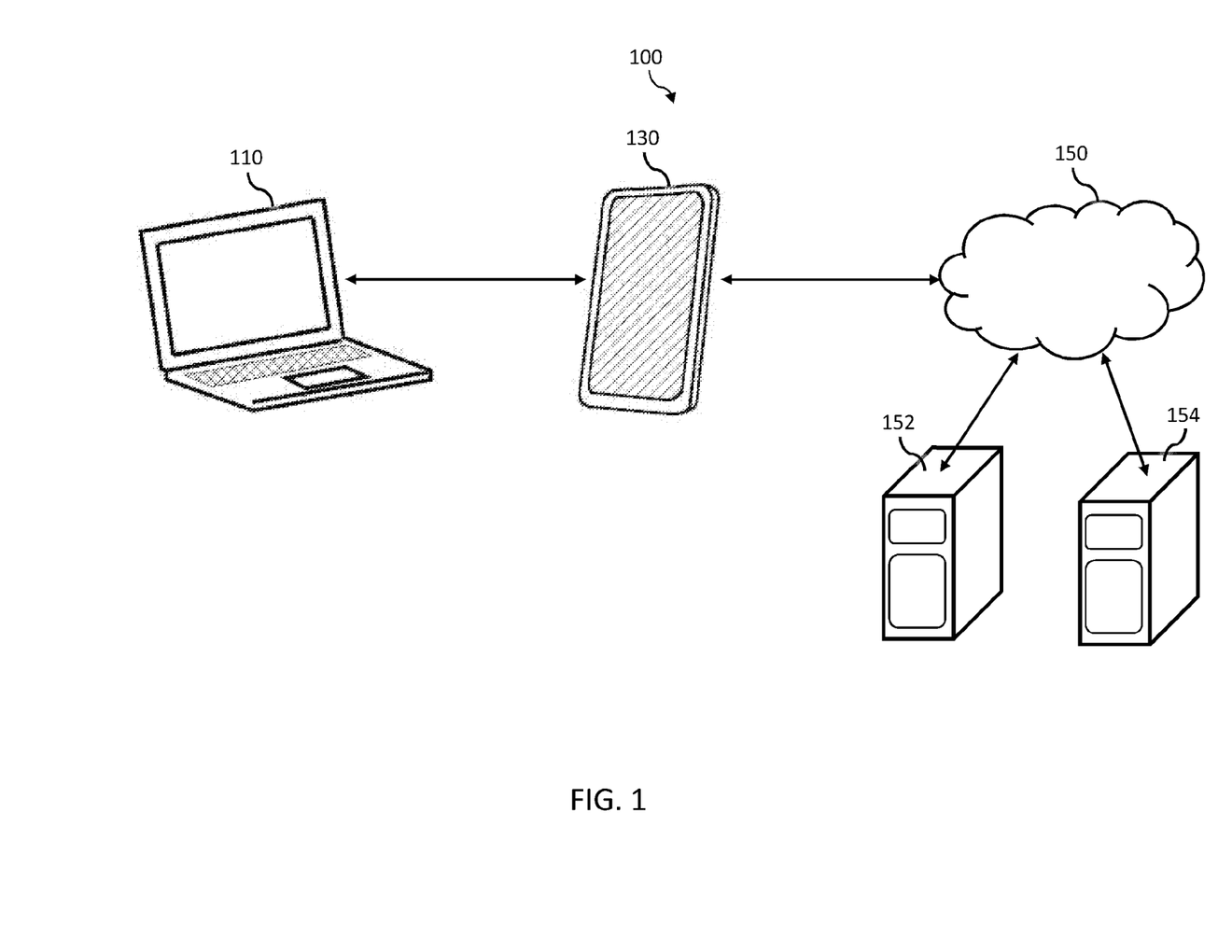
FIG. 1 schematically depicts a system for performing digital forensic triage according to one or more embodiments shown and described herein.

FIG. 1 generally depicts one embodiment of a system for performing forensic triage on a computer. The system generally comprises a mobile device that is communicatively coupled to one or more cloud computing devices via a mobile network. The system also includes machine readable instructions that, when executed by the system, enable the system to automatically perform digital triage analysis. During digital triage a subject computer is analyzed to determine if the subject computer needs to be subjected to a full forensic analysis at the direction of a digital forensics analyst. Accordingly, the systems and methods described herein can be deployed via relatively unskilled users to determine if the subject computer requires further analysis. Various embodiments of the system for performing forensic triage on a computer and the operation of the system for performing forensic triage will be described in more detail herein.

Referring now to FIG. 1, a system 100 for forensic triage is schematically depicted. The system 100 generally comprises a mobile device 130 communicatively coupled, generally indicated by the double arrowed lines, to a first cloud computing device 152 via a cellular network 150. The mobile device 130 can be any device having hardware (e.g., chipsets, processors, memory, etc.) for communicatively coupling with the network interface hardware 122 (FIG. 3) of a computer 110 and a cellular network 150. As used herein, the term "communicatively coupled" means that coupled components are capable of exchanging data signals with one another such as, for example, electrical signals via conductive medium, electromagnetic signals via air, optical signals via optical waveguides, and the like.

Figure 2:
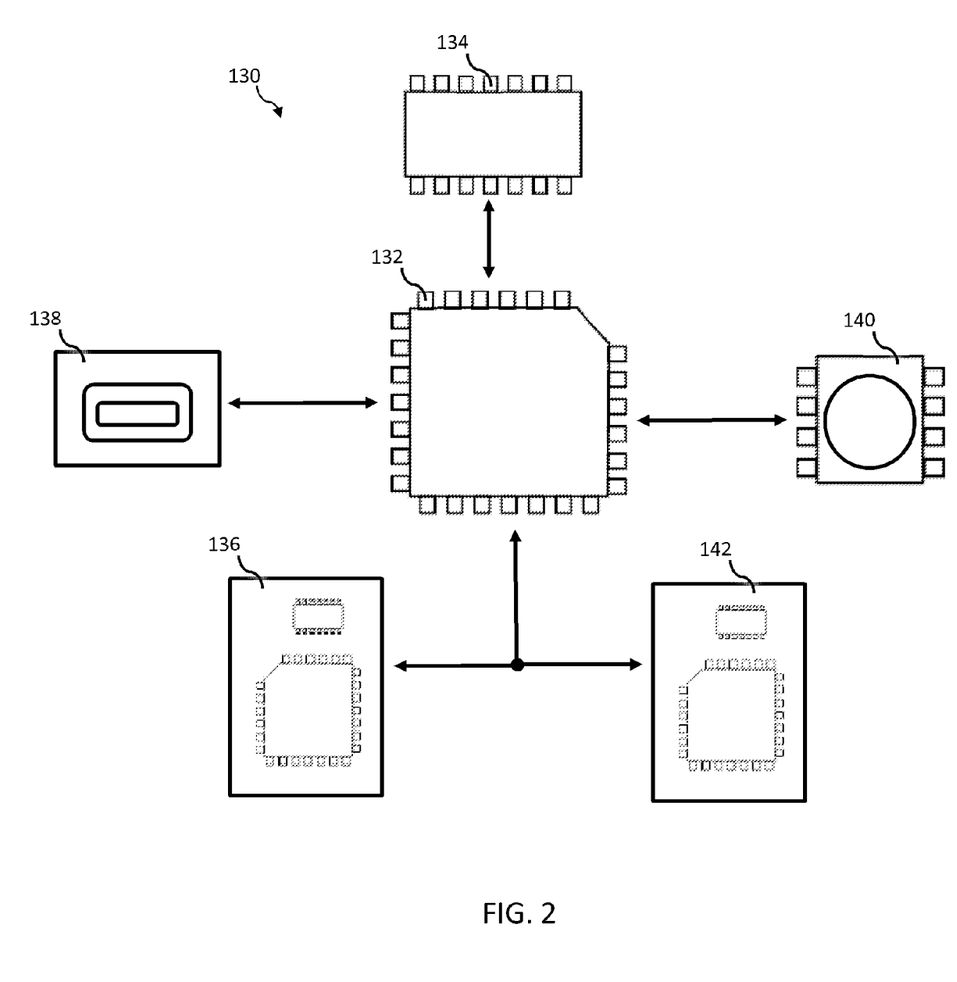
FIG. 2 schematically depicts a mobile device according to one or more embodiments shown and described herein.

Referring to FIG. 2, the mobile device 130 can be any portable computing device capable of exchanging data via a cellular network 150. Specific examples of a mobile device 130 include, but are not limited to, smart phones, tablet devices, e-readers, laptop computers, or the like. The mobile device 130 generally comprises one or more mobile processors 132 for executing machine readable instructions. For the purposes of defining and describing the present disclosure, it is noted that the term "processor," as used herein, means any device capable of executing machine readable instructions such as, for example, a controller, an integrated circuit, a microchip, or the like.

The mobile device 130 comprises one or more mobile memory modules 134 for storing machine readable instructions. The one or more mobile memory modules 134 can be communicatively coupled to the one or more mobile processors 132 such as, for example, via one or more conductive paths (e.g., traces, wires, connectors, or the like). The one or more mobile memory modules 134 can include any type of memory such as the memories 114, 116, and 118 described in greater detail below with respect to a computer 110. In some embodiments, such as when the mobile device 130 is a smart phone, the one or more mobile memory modules 134 can comprise flash memory.

The mobile device 130 can comprise network interface hardware 136 communicatively coupled to the one or more mobile processors 132. The network interface hardware 136 can be any device capable of transmitting and/or receiving data via a wireless network. Accordingly, the network interface hardware 136 can include a chipset (e.g., antenna, processors, machine readable instructions, etc.) for sending and/or receiving data according to any wireless communication standard. For example, the network interface hardware 136 may include a transceiver configured to communicate over wireless computer networks such as, for example, wireless fidelity (Wi-Fi), WiMax, Bluetooth, IrDA, Wireless USB, Z-Wave, ZigBee, or the like.

Wired communication hardware 138 can be communicatively coupled to the one or more mobile processors 132. The wired communication hardware 138 can be configured to provide communication between the one or more mobile processors 132 and devices external to the mobile device 130. Accordingly, the wired communication hardware 138 can include a chipset (e.g., connectors, processors, machine readable instructions, etc.) for sending and/or receiving data according to any wired communication standard. For example, the wired communication hardware 138 may include, for example, a universal serial bus (USB) port, serial port, and parallel ports.

The mobile device 130 can comprise an imaging module 140 communicatively coupled to the one or more mobile processors 132. The imaging module 140 can be configured for collecting image data. Accordingly, the imaging module can include lenses and sensors for capturing still photographs and video, which can be written to the one or more mobile memory modules 134.

The mobile device 130 can comprise mobile network hardware 142 communicatively coupled to the one or more mobile processors 132. The mobile network hardware 142 can be configured for communicating with the cellular network 150. Accordingly, the mobile network hardware 142 can include a chipset (e.g., antenna, processors, machine readable instructions, etc.), i.e., to send and receive data according to a mobile telecommunication standard of any generation (e.g., 1G, 2G, 3G, 4G, 5G, etc.), which can include technologies such as, for example, LTE, UMTS, CDMA, and GSM.

Referring again to FIG. 1, the cellular network 150 generally includes a plurality of base stations that are configured to receive and transmit data according to mobile telecommunication standards. The base stations are further configured to receive and transmit data over wired systems such as public switched telephone network (PSTN) and backhaul networks. The cellular network 150 can further include any network accessible via the backhaul networks such as, for example, wide area networks, metropolitan area networks, the Internet or the like. Thus, the base stations generally include one or more antennas, transceivers, and processors that execute machine readable instructions to exchange data over various wired and/or wireless networks.

Accordingly, the cellular network 150 can be utilized as a wireless access point by the mobile device 130 to access a first cloud computing device 152 and/or a second cloud computing device 154. The first cloud computing device 152 and a second cloud computing device 154 generally include processors, memory modules, and chipsets for delivering resources via the cellular network 150. Resources can include providing, for example, one or more cloud processors, one or more cloud memory modules, software, and information from the first cloud computing device 152 and/or the second cloud computing device 154 via the cellular network 150. It is noted that the one or more cloud processors and the one or more cloud memory modules of the first cloud computing device 152 and/or the second cloud computing device 154 can be arranged in a manner substantially similar to the computer 110 (depicted in FIG. 3). Additionally, it is noted that the first cloud computing device 152 or the second cloud computing device 154 can share resources with one another over the cellular network 150 such as, for example, via the wired portion of the network, the wireless portion of the network, or combinations thereof.

Figure 3:
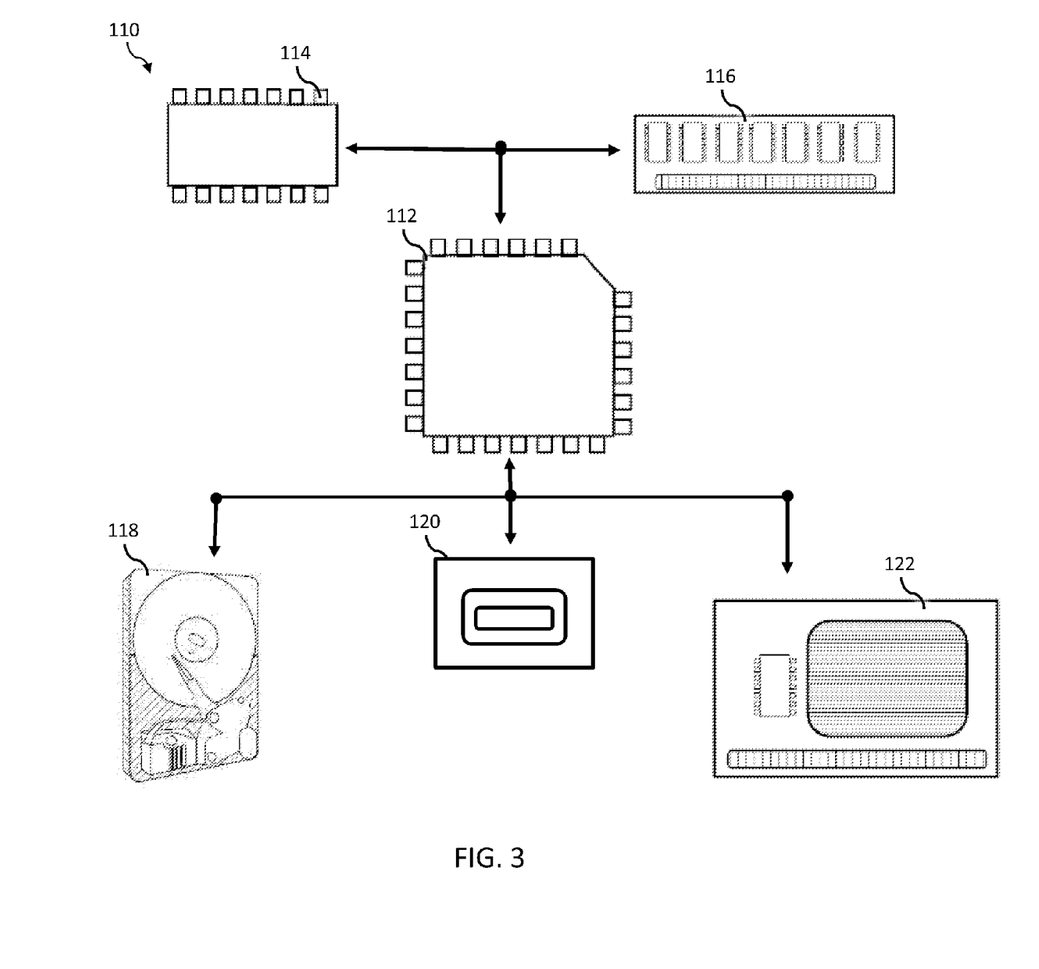
FIG. 3 schematically depicts a computer according to one or more embodiments shown and described herein.

The system 100 may be communicatively coupled to a computer 110. As is depicted in FIG. 3, the computer 110 can comprise a plurality of components that are communicatively coupled to one another via, for example, conductive buses, conductive traces and conductive wires. The computer can comprise one or more processors 112, which can be any device capable of executing machine readable instructions. The one or more processors 112 can be communicatively coupled to one or more read only memory modules 114 (ROM modules). The one or more ROM modules 114 can be any device configured to store machine readable instructions in a substantially non-volatile manner, i.e., the data stored on the one or more ROM modules 114 is not modified when the ROM modules are not powered. In some embodiments, the one or more ROM modules 114 can store machine readable instructions to operate a basic input output system (BIOS). Suitable examples of the one or more ROM modules 114 include, but are not limited to, programmable read-only memory (PROM), erasable programmable read-only memory (EPROM), electrically erasable programmable read-only memory (EEPROM), electrically alterable read-only memory (EAROM), flash memory, or combinations thereof.

The one or more processors 112 can be communicatively coupled to one or more random access memory modules 116 (RAM modules). The one or more RAM modules 116 can be any device configured to store machine readable instructions in a substantially volatile manner, i.e., the data stored on the one or more RAM modules 116 is lost or reset when power is removed from the RAM modules 116. In some embodiments, the one or more RAM modules 116 can be utilized by operating systems and/or applications as the main memory to temporarily write machine readable instructions, or virtual memory. Suitable examples of the one or more RAM modules 116 include, but are not limited to, static RAM (SRAM) or dynamic RAM (DRAM).

The one or more processors 112 can be communicatively coupled to one or more storage modules 118. The one or more storage modules 118 can be any device for storing and retrieving machine readable instructions. In some embodiments, the one or more storage modules 118 can utilized for secondary memory. For example, the one or more storage modules 118 can include a hard drive, which can include one or more rigid rotating platter coated with magnetic material and with magnetic heads for reading and writing upon the magnetic material. Alternatively or additionally, the one or more storage modules 118 can include flash memory.

The computer 110 can comprise wired communication hardware 120 communicatively coupled to the one or more processors 112. The wired communication hardware 120 can be configured to provide communication between the one or more processors 112 and devices external to the computer 110, as described above with respect to wired communication hardware 138.

Referring still to FIG. 2, the computer 110 can comprise network interface hardware 122 communicatively coupled to the one or more processors 112. The network interface hardware 122 can be any device capable of transmitting and/or receiving data via a wireless network. Accordingly, the network interface hardware 122 can include a chipset (e.g., antenna, processors, machine readable instructions, etc.) for sending and/or receiving data according to any wireless communication standard, as is described above with respect to the network interface hardware 136.

The embodiments described herein can perform methods for forensic triage by executing machine readable instructions. The machine readable instructions can comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

It is noted that the machine readable instructions can be stored in a distributed manner throughout the system 100. Accordingly, the machine readable instructions can be stored on the mobile device 130 (e.g., the one or more mobile memory modules 134), and/or one or more of the first cloud computing device 152 and the second cloud computing device 154. Additionally, it is noted that, while the first cloud computing device 152 and the second cloud computing device 154 are the only cloud resources depicted in FIG. 1, the embodiments described herein can utilize any number of cloud resources (e.g., for storage and/or processing) that are communicatively coupled to the cellular network 150.

Moreover, as depicted in FIG. 1, the system 100 can be communicatively coupled to the computer 110. Accordingly, the machine readable instructions, or any subset thereof, can be executed by the one or more processors 112 (FIG. 3) of the computer 110, the one or more mobile processors 132 (FIG. 2) of the mobile device 130, and the cloud processors of any of the cloud computing devices 152, 154. Thus, while particular embodiments may be described herein as being executed by a specific processor, any of the processing steps described herein can be performed by any of the processors.

Figure 4:
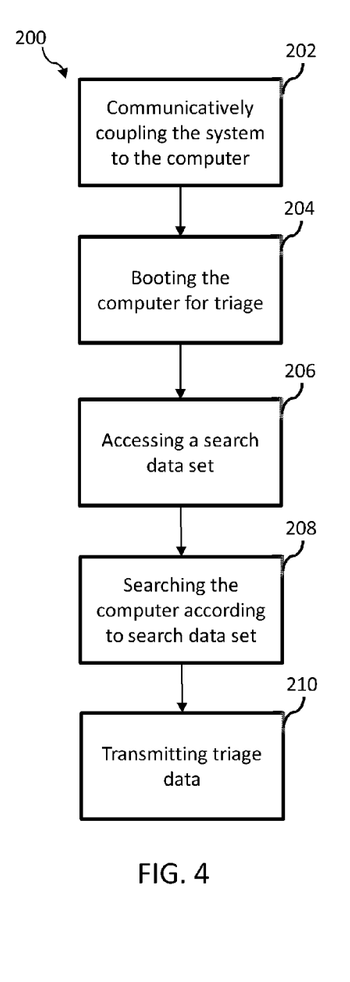
FIG. 4 schematically depicts a method for performing digital forensic triage according to one or more embodiments shown and described herein.

Referring collectively to FIGS. 1 and 4, a method 200 for digital forensic triage is schematically depicted. The method 200 can include a process 202 for communicatively coupling the system 100 and the computer 110. Specifically, the mobile device 130 can be communicatively coupled to the computer 110. In one embodiment, the mobile device 130 and the computer can be communicatively coupled to a conductive medium (e.g., a wire). For example, the wired communication hardware 138 (FIG. 2) of the mobile device can be coupled to the wired communication hardware 120 (FIG. 3) of the computer 110 with a USB cable. Alternatively or additionally, the mobile device 130 and the computer can be communicatively coupled wirelessly. For example, the network interface hardware 136 (FIG. 2) of the mobile device can be coupled to the network interface hardware 122 (FIG. 3) of the computer 110 with a wireless connection (e.g., Bluetooth or Wi-Fi).

Referring collectively to FIGS. 1-4, at process 204 the computer 110 can be booted according to machine readable instructions for digital forensic triage. The machine readable instructions for digital forensic triage can be stored on the one or more mobile memory modules 134 of the mobile device 130, one or more cloud memory modules, or both. The machine readable instructions for digital forensic triage are configured to operate as a substitute operating system for the computer 110 that allows components communicatively coupled to the one or more processors 112 to be accessed in a forensically sound manner. In one embodiment, the substitute operating system can configure any memory accessible by the one or more processors 112 in a read only manner. For example, machine readable information (data) written to the storage modules 118 can be read from the storage modules 118, but the data written to the storage modules 118 cannot be modified or deleted.

In some embodiments, the computer 110 can have a BIOS written on the ROM modules 114. The BIOS can provide machine readable instructions that, when executed by the one or more processors 112, operate and control modules that are communicatively coupled to the one or more processors 112. For example, when the computer 110 is powered from a deactivated state, the BIOS can be executed to operate the modules (e.g., processors, RAM, video display card, keyboard and mouse, hard disk drive, optical disc drive, wired communication hardware, network communication hardware etc.) needed to prepare computer 110 for booting according to an operating system. In normal operation, the BIOS can be executed to initialize hardware such that an operating system or runtime environment may be loaded from storage modules 118, loaded into the RAM modules 116, and executed by the one or more processors 112. Once booted, the operating system can supersede the BIOS to provide functionality to operate the computer 110.

The BIOS can also provide a user interface that can be accessed by pressing a certain key on the keyboard before the operating system is executed. The BIOS user interface can include functions that allow the modules communicatively coupled to the one or more processors 112 to be configured, and devices to be selected as a device that is eligible to be a boot device. In some embodiments, the BIOS user interface can be accessed in order to select the one or more mobile memory modules 134 of the mobile device 130 as the boot device. Accordingly, the computer 110 can be booted according to the substitute operating system of the mobile device.

Referring still to FIGS. 1-4, at process 206, a search data set can be accessed by the one or more processors 112 of the computer 110, the one or more mobile processors 132 of the mobile device 130, and/or the cloud processors of any of the cloud computing devices 152, 154. The search data set can be stored on the one or more mobile memory modules 134 of the mobile device 130 and/or the cloud memory modules of any of the cloud computing devices 152, 154. In some embodiments, the search data set can be synchronized between the mobile device 130 and any of the cloud computing devices 152, 154. Accordingly, the search data set can be updated in the cloud computing devices 152, 154 and deployed to the mobile device 130 via the cellular network 150. Moreover, in some embodiments, the mobile device 130 can include a user interface for receiving input that alters the search data set. Thus, the mobile device 130 can have a control for setting whether the mobile device 130 pushes data or pulls data during system synchronization.

The search data set can comprise data for cross-referencing or identifying useful information that can be accessed by the one or more processors 112 of the computer 110. The search data set can include a keyword list, a hash list, a search list, or a combination thereof that include data sufficient to identify particular data of interest that is associated with the computer 110. For example, the one or more ROM modules 114, or the one or more storage modules 118 can include web browser history, file hashes, keywords, installed applications, recently used documents, wireless access points that have been accessed, system users, document content identification, or the like.

The search data set can comprise a keyword list for identifying pre-determined keywords of interest within text files stored in the one or more ROM modules 114, or the one or more storage modules 118. The key word list can comprise a plurality of keywords of interest (e.g., text strings or the like) that are delimited. In one embodiment, every unique keyword or phrase can be on its own line within the file corresponding to the keyword list. Table 1 provides a summary of exemplary keywords that can be associated with the keyword list.

TABLE 1 test@email.org
western digital
123 Main Street
5941237358749874
hexadecimal
binary
pat orvell
Kathryn Adams
Mohammed
few years of private education
coal-barges
Abdullah Azzam
Omar Abdel-Rahman
Hekmatyar The search data set can comprise a hash list for identifying hashes that can be associated with a file stored in the one or more ROM modules 114, or the one or more storage modules 118. The hashes generally correspond to output from a cryptographic hash function that can be utilized to uniquely identify a file. Example hash functions include, but are not limited to, Message-Digest Algorithm (e.g., MD2, MD3, MD4, MD5 and MD6), secure hash algorithms (e.g., SHA-0, SHA-1, and SHA-2), or the like. Table 2 provides a summary of exemplary hash list that comprises MD5 hashes with 32 characters and a text description of file associated with the hash.

TABLE 2

| MD5 Hash | Description |
| --- | --- |
| 49da04e1af4c52e7e37e3ff049649f86 | history.txt |
| aa513b76693f5e8fcdbdb83f8d9180b6 | dickens.txt |

TABLE 2-continued

| MD5 Hash | Description |
| --- | --- |
| 3ba23dc0478af3ef3e845c1845d680df | DarkReading__2011__01.pdf |
| a3c382663ba73d1b8eb001393fb2ccbe | How to be Anonymous on the internet.pdf |
| 27c665cab6f8945bb99c3fc9274f735e | news__driver.doc |

The search data set can comprise a search list for identifying pre-determined system resources that are stored in the one or more ROM modules 114, or the one or more storage modules 118. Exemplary system resources include, but are not limited to, operating system details (e.g., version architecture 32/64bit, installation path, registered organization, registered owner, computer name, time zone information, last shutdown time, page file/swap file status, registry, system-wide configuration files, event lists, event log, password configuration or the like), installed applications, user accounts (e.g., user name, last login date/time, password hint, user SID, last password changed date/time, total logins, user assist items, web browsers, most recently used (MRU) documents, chat accounts, start-up applications, network places, contacts, regional settings, or the like), wired/wireless networks (e.g., IP addresses, default gateway, DCHP server, domain, DNS server, lease obtained & expiration, encryption type, network authentication, last accessed date and times, or the like), internet history (e.g., top level domains, number of hits, typed URLs, downloads, cookies, saved form data, saved login data, bookmarks, or the like), identified USB devices (e.g., serial number, friendly name, last write time), recycle bin data (e.g., full path, file size, date deleted, file emptied, or the like), Chat/VOIP programs (e.g., last login, chat messages, buddy lists/user names, date/time of conversations, or the like), and mount points (e.g., physical disk, USB storage, IDE, SCSI, or the like). The search list can be used to identify a search parameter associated with a type of system resource and an identifier that identifies a specific instance of the system resource. Table 3 provides a summary of an exemplary search list that includes associated with installed application, wireless network SSID, USB serial number (USBS), startup application, visited URL domain, chat account name, and contact, and identifiers to identify a particular instance of the search parameter.

TABLE 3

| Search Parameter | Identifier |
| --- | --- |
| INSTALLED APPS | CCleaner |
| INSTALLED APPS | TrueCrypt |
| INSTALLED APPS | Spybot - Search & Destroy |
| INSTALLED APPS | ZoneAlarm |
| NETWORKS | THESWAMP |
| STARTUP APPS | ZoneAlarm Client |
| USBS | 3335AD79AD8800EC |
| USBS | 00001566A960C638 |
| DOMAINS | washingtonpost.com |
| DOMAINS | cryptome.org |
| DOMAINS | paterva.com |
| CHAT NAMES | ybor202020 |
| CHAT NAMES | lakeland.2020 |
| CONTACTS | Bob Smith |

Referring collectively to FIGS. 1-4, at process 208, the computer 110 can be searched in a read only mode for data that corresponds to the data. Specifically, the one or more processors 112 of the computer 110, the one or more mobile processors 132 of the mobile device, or both, can execute the machine readable instructions compare the search data set to data stored in the one or more ROM modules 114, or the one or more storage modules 118 of the computer 110. Items that match the search data set can be identified. In some embodiments, data indicative of a match between the search data set and the data stored in the one or more ROM modules 114, or the one or more storage modules 118 of the computer 110 can be associated with the search data set. For example, the number of hits that correspond with each item of the keyword list, hash list, and/or search list can be stored as triage data in the one or more mobile memory modules 134 of the mobile device 130. Alternatively or additionally, the data stored in the one or more ROM modules 114, or the one or more storage modules 118 of the computer 110 that corresponds to the search data can be copied and stored in the one or more mobile memory modules 134 of the mobile device 130 as triage data.

According to the embodiments described herein, the imaging module 140 of the mobile device 130 can be utilized to capture image data. For example, it may be desired to collect images of the computer 110 and the environment around the computer 110 prior to communicatively coupling the mobile device 130 and the computer 110. Such images can be collected and automatically associated with any triage data by the system 100.

At process 210, the triage data can be transmitted via the one or more communication modules of the mobile device 130 to the first cloud computing device 152 and/or the second cloud computing device 154. In one embodiment, the mobile device 130 can transmit the triage data with the mobile network hardware 142 via the cellular network 150. Alternatively, the triage data can be transmitted with the network interface hardware 136. For the purpose of defining and describing the present disclosure, it is noted that the phrase "triage data," as used herein, means data from the computer 110 that has been filtered according to the search data set. In some embodiments, all of the data associated with the triage data can be transmitted with the triage data.

In further embodiments, all of the system resource data can be copied from the computer 110 and associated with the triage data. Specifically, system resource data can be copied from the computer 110 and saved in the one or more mobile memory modules 134. Moreover, the system resource data can be utilized upon completion of the digital forensic triage to restore the computer 110 to its pre-triaged state, i.e., the fact that a triage was performed can be obscured. Specifically, in one embodiment, the computer 110 can be shut down and rebooted under the control of the machine readable instructions of the system 100. The operating system details such as, for example, version architecture 32/64bit, installation path, registered organization, registered owner, computer name, time zone information, last shutdown time, page file/swap file status, registry, system-wide configuration files, event lists, event log, password configuration or the like can be restored using the system resource data from the one or more memory modules 134.

Figure 5:
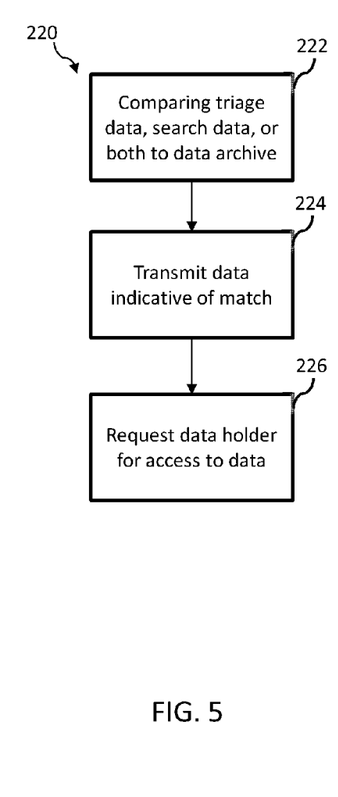
FIG. 5 schematically depicts a method for performing digital forensic triage according to one or more embodiments shown and described herein.

Referring collectively to FIGS. 1 and 5, a method 220 for digital forensic triage is schematically depicted. The method 220 can optionally be performed after the method 200. For example, the triage data and the search data set can be stored in one or more cloud memory modules. Moreover, a data archive can be stored in one or more cloud memory modules. Accordingly, analysis of triage data with respect to the data archive can be performed at any time.

At process 222 the triage data, the search data set, or both can be compared to data stored in the data archive. The data archive can be protected by a firewall. Accordingly, data can be segregated based upon the owner (e.g., law enforcement agency) of the data or for other security reasons. Moreover, the data archive can be queried without revealing the contents of the data archive. For example, the system 100 can receive input indicative of a desire to share the triage data or the search data set with a data archive. When the data archive is protected by a firewall, the system 100 can automatically compare (e.g., with one or more cloud processors) the contents of the data archive and the triage data, the search data set, or both. Data indicative of a match between the contents of the data archive the triage data, the search data set, or both can be generated automatically. The data indicative of the match the can be limited to a notification that a match exists. That is, the notification can be limited such that identity of the data owner and the data stored in the data archive are not provided by the notification.

At process 224, the data indicative of a match can be transmitted by the system 100 over the cellular network 150 to the first cloud computing device 152, the second cloud computing device 154, the mobile device 130, or a combination thereof. The notification can be provided to the owner of the triage data and/or the search data set. For example, the first cloud computing device 152 can be configured to operate as a cloud resource for a first organization and the second cloud computing device 154 can be configured to operate as a cloud resource for a second organization for storing the data archive. Both the first cloud computing device 152 and the second cloud computing device 154 can be configured to execute the machine readable instructions of the system 100. Accordingly, the first cloud computing device 152 and the second cloud computing device 154 can operate commonly as components of the system 100 that are segregated from one another. The triage data and/or the search data set can be data that is owned by the first organization and stored on the first cloud computing device 152 and/or the mobile device 130. Accordingly, the notification can be generated automatically by the system 100 and provided to the first cloud computing device 152 and/or the mobile device 130.

At process 226, the system 100 can automatically request access to the contents of the data archive. Continuing with the previous example, after generating the notification, the system 100 can be configured to receive input indicative of a desire to access the data archive. Specifically, first cloud computing device 152 and/or the mobile device 130 can provide a control element (e.g., a graphical user interface) that receives input indicative of a request to access the data archive. Upon receipt of the request, the system 100 can provide a control element to the second cloud computing device 154 configured to receive input indicative of a grant of access to the data archive. If access is granted, the system 100 can automatically allow the first cloud computing device 152 and/or the mobile device 130 to access the data archive of the second cloud computing device 154. If access is denied, the system 100 can automatically provide notice to the first cloud computing device 152 and/or the mobile device 130 that access has been denied. Accordingly, data can be shared across organizations without compromising the source of the data or other organizational information without the consent of the data owner.

It should now be understood that the embodiments described herein provide a mobile deployment of an automated process for triaging a subject computer. Accordingly, the triage can be performed by a relatively untrained user to examine the subject computer, while mitigating contamination of potential evidence on the subject computer. Moreover, the embodiments described herein provides for the pushing of search indicators to the mobile device by advanced users from a cloud computing device. Thus, digital triage can be performed with reduced training requirements, reduced processing times, and real time communication with experts with the ability to bring the most up to date information to the triage process. Moreover, total cost of ownership can be reduced, while improving scene accuracy.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for forensic triage comprising:
    coupling, communicatively, a computer and a mobile device, wherein the computer comprises one or more processors conductively coupled to one or more memory modules and the mobile device comprises one or more mobile processors conductively coupled to one or more mobile memory modules and one or more communication modules, and machine readable instructions stored on the one or more mobile memory modules of the mobile device;
    booting the computer with the machine readable instructions stored on the one or more mobile memory modules of the mobile device;
    receiving a search data set with the one or more mobile processors of the mobile device, wherein the search data set comprises a keyword list that comprises a plurality of keywords of interest, a hash list that comprises a plurality of hashes that correspond to output from a cryptographic hash function, and a search list that comprises a plurality of identifiers that each correspond to an instance of a system resource;
    executing, automatically with the one or more processors, the one or more mobile processors, or both, the machine readable instructions stored on the one or more mobile memory modules of the mobile device to search the one or memory modules of the computer in a read only mode for triage data that corresponds to the search data set;
    coupling, communicatively, the mobile device and a cloud computing device with a cellular network; and
    transmitting the triage data via the one or more communication modules of the mobile device over the cellular network.

2. The method of claim 1, further comprising: storing the triage data in the one or more mobile memory modules of the mobile device.

3. The method of claim 1, further comprising: coupling, communicatively, the mobile device and a cloud computing device with the cellular network, wherein the cloud computing device comprises one or more cloud processors communicatively coupled to one or more cloud memory modules, and wherein the triage data is transmitted over the cellular network and stored in the one or more cloud memory modules.

4. The method of claim 3, further comprising:
    pushing the search data set from the cloud computing device to the mobile device over the cellular network.

5. The method of claim 3, further comprising:
    pushing the search data set from the mobile device to the cloud computing device over the cellular network.

6. The method of claim 1, further comprising: copying, automatically with the one or more processors, the one or more mobile processors, or both, one or more system resources from the one or more memory modules of the computer to the one or more mobile memory modules of the mobile device.

7. The method of claim 6, further comprising:
shutting the computer down;
rebooting the computer with the machine readable instructions stored on the one or more mobile memory modules of the mobile device; and
restoring the one or more system resources from the one or more mobile memory modules of the mobile device to the one or more memory modules of the computer, wherein the one or more system resources comprises at least one operating system detail.

8. The method of claim 1, further comprising: capturing image data; and associating, automatically with the one or more mobile processors, the image data with the triage data in the one or more mobile memory modules of the mobile device.

9. The method of claim 1, wherein the computer and the mobile device are communicatively coupled with a wire.

10. The method of claim 1, wherein the computer and the mobile device are communicatively coupled with a wirelessly.

\* \* \* \* \*